(12) United States Patent
Chen et al.

(10) Patent No.: US 11,447,203 B2
(45) Date of Patent: Sep. 20, 2022

(54) POWERED PERSONAL MOBILITY VEHICLE WITH ROTATING WHEELS

(71) Applicant: RAZOR USA LLC, Cerritos, CA (US)

(72) Inventors: Robert Chen, San Marino, CA (US); Robert Hadley, Yorba Linda, CA (US); William Griggs, Anaheim, CA (US)

(73) Assignee: Razor USA LLC, Cerritos, CA (US)

( * ) Notice: Subject to any disclaimer, the term of this patent is extended or adjusted under 35 U.S.C. 154(b) by 0 days.

(21) Appl. No.: 16/527,406

(22) Filed: Jul. 31, 2019

(65) Prior Publication Data

US 2020/0062328 A1 Feb. 27, 2020

Related U.S. Application Data

(66) Continuation of application No. 15/605,176, filed on May 25, 2017, now Pat. No. 10,370,053, which is a continuation of application No. 14/934,621, filed on Nov. 6, 2015, now Pat. No. 9,663,178, which is a continuation of application No. 14/444,926, filed on Jul. 28, 2014, now Pat. No. 9,180,927, which is a continuation of application No. 13/800,146, filed on Mar. 13, 2013, now Pat. No. 8,820,460, Substitute for application No. 61/616,103, filed on Mar. 27, 2012.

(51) Int. Cl.
*B62K 5/025* (2013.01)
*B62K 5/027* (2013.01)
*B60L 50/60* (2019.01)
*B60B 33/00* (2006.01)
*B62K 23/04* (2006.01)
*B62L 3/02* (2006.01)

(52) U.S. Cl.
CPC .......... *B62K 5/025* (2013.01); *B60B 33/0068* (2013.01); *B60L 50/60* (2019.02); *B60L 50/66* (2019.02); *B62K 5/027* (2013.01); *B62K 23/04* (2013.01); *B62L 3/02* (2013.01)

(58) Field of Classification Search
CPC .......... B62K 5/025; B62K 5/027; B62K 5/06; B62K 23/04; B60B 33/0068; B62L 3/02; B60L 50/50; B60L 50/60; B60L 50/66
See application file for complete search history.

(56) References Cited

U.S. PATENT DOCUMENTS

| | | |
|---|---|---|
| 684,516 A | 10/1901 | Leechman |
| 700,209 A | 5/1902 | Lawson |
| 1,237,714 A | 8/1917 | Smith |
| 2,503,106 A | 4/1950 | Fritz |
| 2,819,093 A | 1/1958 | Geiser |
| 3,062,559 A | 6/1959 | Hewitt |
| 3,031,024 A | 4/1962 | Ulinski |
| 3,605,929 A | 9/1971 | Rolland |
| 3,713,502 A * | 1/1973 | Delaney ................ B60L 50/20 180/206.5 |

(Continued)

*Primary Examiner* — Laura Freedman
(74) *Attorney, Agent, or Firm* — Knobbe, Martens, Olson & Bear, LLP

(57) ABSTRACT

An electric powered personal mobility vehicle that includes at least one front wheel and an electric motor that provides rotational force to a wheel of the vehicle. The electric motor is supported by the vehicle and is powered by a rechargeable battery that is also supported by the vehicle. The vehicle can also include swivel caster wheels each configured to rotate about a wheel axis.

25 Claims, 6 Drawing Sheets

(56) References Cited

U.S. PATENT DOCUMENTS

| | | | |
|---|---|---|---|
| 3,909,043 A * | 9/1975 | Black | B62K 5/02 280/269 |
| 4,087,106 A | 5/1978 | Winchell | |
| 4,237,995 A | 12/1980 | Pivar | |
| 4,272,095 A * | 6/1981 | Ptaszek | B60B 33/021 280/220 |
| 4,293,052 A | 10/1981 | Daswick et al. | |
| 4,403,673 A | 9/1983 | Ball | |
| 4,423,795 A | 1/1984 | Winchell et al. | |
| 4,452,327 A | 6/1984 | Mowat | |
| RE32,031 E | 11/1985 | Winchell | |
| 5,257,671 A | 11/1993 | Watkins | |
| 5,467,838 A | 11/1995 | Wu | |
| 5,628,379 A | 5/1997 | Watkins | |
| 5,816,354 A | 10/1998 | Watkins | |
| 5,904,218 A | 5/1999 | Watkins | |
| 5,983,614 A | 11/1999 | Hancock | |
| 6,371,235 B1 | 4/2002 | Wisecarver | |
| D484,073 S * | 12/2003 | Heinemann | D12/112 |
| 7,044,491 B2 * | 5/2006 | Kettler | B62K 5/08 280/282 |
| D582,489 S * | 12/2008 | Badanjo | D21/435 |
| 7,537,076 B2 * | 5/2009 | Falkiner | A63B 55/57 180/208 |
| D593,910 S * | 6/2009 | Calvin | D12/112 |
| 7,631,715 B2 * | 12/2009 | Falkiner | B62K 5/027 180/215 |
| 7,712,558 B2 | 5/2010 | Helson et al. | |
| 7,823,675 B2 | 11/2010 | Kermani | |
| 7,967,095 B2 | 6/2011 | Kosco et al. | |
| 8,249,775 B2 | 8/2012 | Van Den Brink | |
| 8,365,850 B2 | 2/2013 | Gal et al. | |
| 8,596,649 B2 * | 12/2013 | Bricker | B62K 9/02 280/7.17 |
| 8,746,723 B2 | 6/2014 | Chen et al. | |
| 8,820,460 B2 | 9/2014 | Chen et al. | |
| 9,108,693 B2 * | 8/2015 | Fitzwater | B62K 9/00 |
| 9,180,927 B2 | 11/2015 | Chen et al. | |
| 9,663,178 B2 | 5/2017 | Chen et al. | |
| 10,370,053 B2 | 8/2019 | Chen et al. | |
| 2004/0040769 A1 | 3/2004 | Richey et al. | |
| 2007/0045022 A1 | 3/2007 | Greig et al. | |
| 2008/0196951 A1 | 8/2008 | Gal et al. | |
| 2012/0256389 A1 | 10/2012 | Chen et al. | |

* cited by examiner

POWERED PERSONAL MOBILITY VEHICLE WITH ROTATING WHEELS

PRIORITY INFORMATION

The present application is a continuation of U.S. patent application Ser. No. 15/605,176, filed May 25, 2017, now U.S. Pat. No. 10,370,053, issued Aug. 6, 2019, which is a continuation of U.S. patent application Ser. No. 14/934,621, filed Nov. 6, 2015, now U.S. Pat. No. 9,663,178, issued May 30, 2017, which is a continuation of U.S. patent application Ser. No. 14/444,926, filed Jul. 28, 2014, now U.S. Pat. No. 9,180,927, issued Nov. 10, 2015, which is a continuation of U.S. patent application Ser. No. 13/800,146, filed Mar. 13, 2013, now U.S. Pat. No. 8,820,460, issued Sep. 2, 2014, which claims the benefit of U.S. Provisional Application No. 61/616,103, filed Mar. 27, 2012, the entirety of each of which is hereby incorporated by reference herein.

BACKGROUND OF THE DISCLOSURE

Field of the Invention

Embodiments of the invention relate generally to personal mobility vehicles and, more specifically, to an electric powered personal mobility vehicle such as a tricycle, with rear swivel caster wheels.

Description of the Related Art

Three and four-wheeled vehicles, commonly known as tricycles and go-karts, respectively, comprise at least one front wheel and a pair of spaced rear wheels, and many types and styles of these vehicles have been developed for use by both children and adults. Riding on tricycles or go-karts is a popular recreational activity. This is especially true for younger age children who do not yet have the physical coordination and skill necessary to ride more advanced recreational vehicles such as two-wheeled bicycles, skateboards, roller skates, or two-wheeled scooters. Adults can also enjoy appropriately sized four and three-wheeled vehicles configured in the same style as children's tricycles and go-karts, although they may not be referred to as tricycles or go-karts, these adult vehicles may have the same functionality or characteristics as the children's tricycles and go-karts.

There have been different types of tricycles devised over the years. Most of these tricycles perform the normal function of moving when pedaled by the user and turning on a radius determined by manipulation of the handlebars controlling the front wheel. The conventional tricycles provide useful means of transportation and recreation, but due to the limited range of motion of the front and rear wheels, the conventional tricycles are limited in the type of movement provided to the user. There have also not been many variations on the manner in which a tricycle is operated by the user. Conventional tricycles require the user to exert rotational force on the front wheel, usually by foot pedals connected to a single crank attached to the front wheel available to the user in a seated position. It is an object of one or more embodiments of the present invention to provide a new and improved ride-on tricycle. It is still another object of one or more embodiments of the present invention to provide a new and improved tricycle providing a unique turning action and an alternate range of motion compared to conventional tricycles.

SUMMARY OF THE DISCLOSURE

Preferred embodiments of the tricycle are configured to comprise a rechargeable battery or other power source and electric motor configured to provide power to at least one wheel of the tricycle to provide propulsion. A preferred embodiment is a tricycle including at least one front wheel, and at least two rear wheels, an interconnecting frame, a front fork connected to the at least one front wheel, handlebars coupled to the front fork to provide steering of the front wheel, and a seat for the user. The tricycle may also include a battery housing mounted to the frame comprising a controller and at least one battery or other power source, and an electric motor mounted on the front fork and operably coupled to the front wheel to provide powered rotational force upon the front wheel. In another preferred embodiment, the seat for the user is mounted to the frame and positioned in front of the battery housing. In yet another preferred embodiment, the battery housing is mounted at the rear of the frame to increase centrifugal forces by the weight of the battery housing when the user causes the rear of the tricycle to travel in a substantially different direction than the direction of the front wheel.

In one embodiment, a personal mobility vehicle comprises a frame, at least one front wheel, and at least two rear wheels supported by the frame. Each of the at least two rear wheels is a swivel caster wheel configured to rotate about a swivel axis. A front fork is rotatably supported by the frame and the front fork is rotatably supporting the at least one front wheel. A handlebar is coupled to the front fork and is configured to provide steering of the at least one front wheel. The vehicle further comprises a seat that is supported by the frame and configured to support a user. A battery or other battery source is supported by the frame and the battery is operably coupled to a controller. The vehicle further comprises an electric motor operably coupled to the battery and configured to receive electric power from the battery, the electric motor being operably coupled to the at least one front wheel to provide rotational force to the at least one front wheel. The controller is accessible to a user and configured to allow a user to control the transfer of rotational force to the at least one front wheel.

In another embodiment, a personal mobility vehicle comprises a frame with a front portion and rear portion. A steering portion is supported by the front portion of the frame and the steering portion includes a handlebar. The vehicle also includes a front wheel operably coupled to the steering portion and the front wheel is rotatable relative to the frame. At least two rear wheels are supported by the rear portion of the frame and a seat is supported by the frame and configured to at least partially support a user. The vehicle further comprises a brake mechanism configured to stop or slow the motion of the vehicle by engaging the front wheel, and the brake mechanism comprises a brake actuator that is accessible to a user. A foot support is supported by the frame and fixed relative to the frame, and the foot support is accessible to the foot of a user. The vehicle also includes a power source is supported by the frame and configured to provide rotational power to the front wheel to move the vehicle on a riding surface. Each of the at least two rear wheels is a swivel caster wheel configured to rotate relative to the frame, and each of the at least two rear wheels has a swivel axis and is configured to rotate about its swivel axis.

In another embodiment, each of the at least two rear wheels are swivel caster wheels configured to rotate about its swivel axis. In another embodiment, each of the at least two rear wheels are swivel caster wheels configured to freely rotate through 360 degrees about its swivel axis. Also, a biasing mechanism can be operably coupled to each of the at least two rear swivel caster wheels to limit the degree of rotation of each wheel, and to return each rear wheel to its neutral steering position once the external swiveling forces have been removed.

In a preferred embodiment, the electric motor is mounted on the front fork and operably coupled to the front wheel, and the power delivered to the electric motor is controlled by an acceleration pedal. In another preferred embodiment, the power delivered to the electric motor is controlled by a hand crank throttle. In one preferred embodiment, the electric motor delivers power to the front wheel through a chain and sprocket configuration, wherein a sprocket is mounted to the axis of the front wheel. In another preferred embodiment, the electric motor delivers power to the front wheel through a roller configured to apply frictional rotational force upon the outer circumference of the front wheel. In another preferred embodiment, the tricycle comprises a braking mechanism configured to allow a user to apply braking force to at least one wheel of the tricycle while simultaneously cutting off power from the motor to the driven wheel.

BRIEF DESCRIPTION OF THE DRAWINGS

These and other features, aspects, and advantages of the present invention are described below with reference to illustrations of a preferred embodiment, which is intended to illustrate, but not to limit, the present invention.

DETAILED DESCRIPTION OF THE PREFERRED EMBODIMENTS

Figure 1:
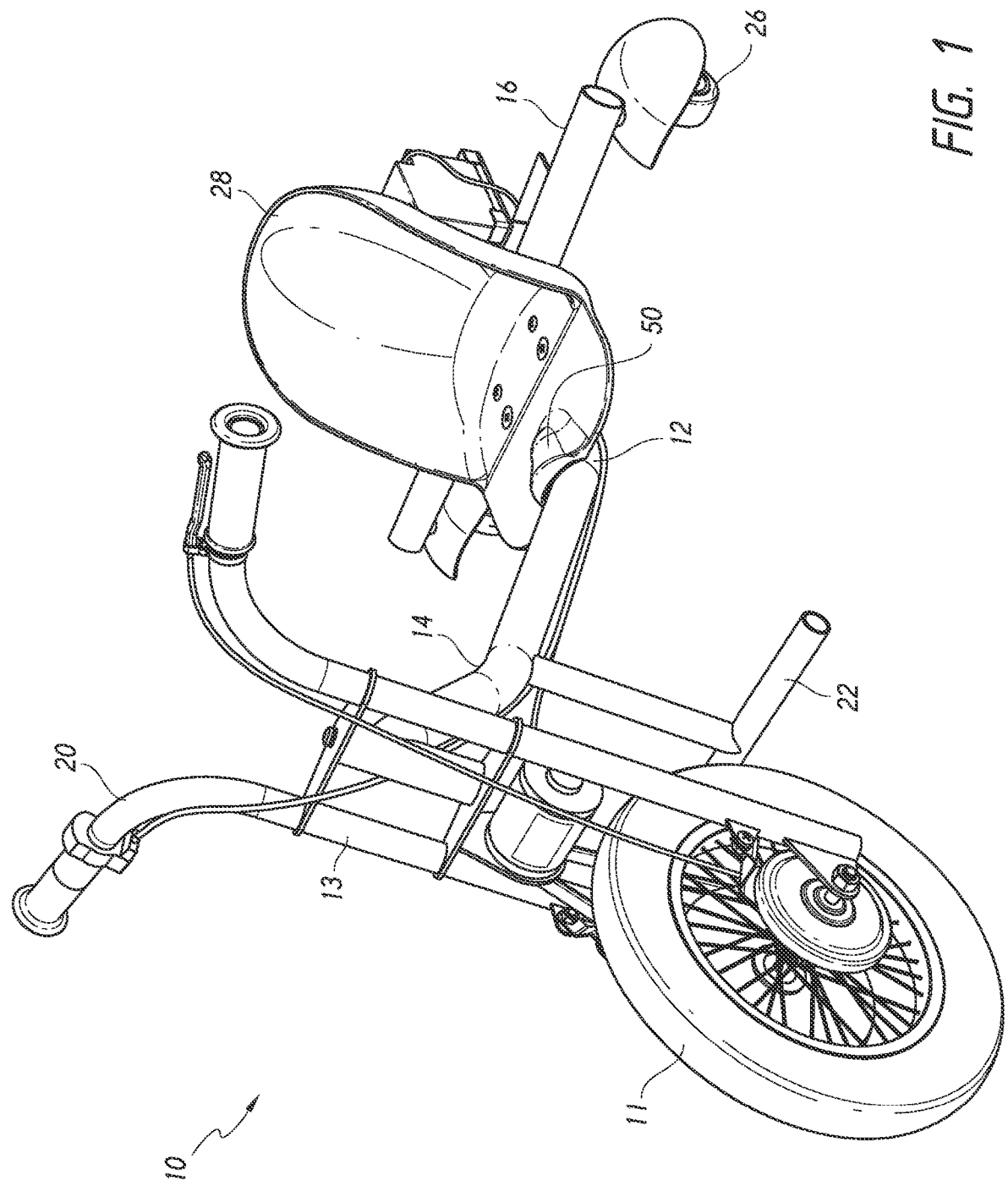
FIG. 1 is a perspective front and left side view of an embodiment of an electric powered tricycle having certain features, aspects, and advantages of the present invention.

For the purposes of this disclosure, embodiments of personal mobility vehicles will be referred to as "tricycles", but it will be understood by those with ordinary skill in the art that the present invention extends beyond the specifically disclosed embodiments and references to tricycles to other alternative embodiments and/or uses of the invention and modifications and equivalents thereof. In particular, while the present systems and methods have been described in the context of particularly preferred embodiments as it relates to tricycles, the skilled artisan will appreciate, in view of the present disclosure, that certain advantages, features and aspects of the systems and methods may be realized in a variety of other applications, including personal mobility vehicles other than tricycles with at least one steerable front wheel and at least two rear wheels.

Reference will now be made in detail to the alternative embodiments of the present technology. While numerous specific embodiments of the present technology will be described in conjunction with the alternative embodiments, it will be understood that they are not intended to limit the present technology to these embodiments. On the contrary, these described embodiments of the present technology are intended to cover alternatives, modifications and equivalents. Furthermore, in the following detailed description, numerous specific details are set forth in order to provide a thorough understanding of the present technology. However, it will be recognized by one of ordinary skill in the art that embodiments may be practiced without these specific details. In other instances, well known methods, procedures, compounds, compositions and mechanisms have not been described in detail as not to unnecessarily obscure aspects of embodiments of the present technology.

Preferred embodiments of a personal mobility vehicle or tricycle are configured to allow a user to activate a throttle assembly which causes an electric motor to power at least one wheel of the personal mobility vehicle or tricycle. A preferred embodiment involves a tricycle having at least one rear swivel caster wheels allowing the user to cause the rear portion of the tricycle to travel in a substantially different direction than the direction of the front wheel. A swivel caster wheel typically includes a wheel configured to rotate around a rotational axis and a fork supporting the wheel, which enables the wheel to swivel around a swivel axis. One embodiment may further comprise a foot rest portion for the user to place the user's feet away from the front wheel and motor while operating the tricycle. A preferred embodiment may comprise a braking mechanism configured to apply a braking force to at least one wheel of the tricycle. The braking mechanism may be configured such that an actuating means is available to one or more of the user's hands or feet while the user is seated. Yet another embodiment comprises a handlebar and front fork assembly configured to provide a steering means for the front wheel of the tricycle, and further configured to support the front wheel and an electric motor driving said front wheel.

Referring now to FIG. 1, a preferred embodiment of the invention is illustrated showing a tricycle 10 which comprises a frame 12 having a front wheel 11 mounted to a front fork 13; the frame 12 having a front portion 14 and a rear portion 16; the steerable front wheel 11 is attached to the front fork 13 and also a handlebar assembly 20, both of which are rotatably connected to the front portion 14 of the frame 12. It also includes a foot rest 22, and at least two rear wheels 26, the two rear wheels supported by the rear portion 16 of the frame 12. The foot rest 22 is supported by the frame 12 at a location accessible to the foot of a user and is fixed relative to the frame. Although a single steerable wheel is shown in FIG. 1, two or more steerable wheels may be included, and may be in the form of two front wheels. In a number of embodiments, the two or more wheels are aligned to enable steering of the tricycle. The illustrated front fork 13 and handlebar assembly 20 are integrated with one another, however, in other arrangements, the fork 13 and handlebar 20 can be separate components or assemblies coupled to one another. In addition, although illustrated as a separate component, the front fork 13 can be considered as part of the overall frame assembly of the tricycle/vehicle.

In a preferred embodiment, an electric motor 30 is mounted to the tricycle 10, such as to the frame 12 or, preferably, to the front fork 13 such that the electric motor is rotated about a steering axis with the front fork 13 when the user acts to turn the front wheel 11. Preferably, the steering axis is inclined with respect to the surface upon which the tricycle 10 is supported or ridden. Preferably, the steering axis is inclined in a rearward direction from a line that extends perpendicular to the surface upon which the tricycle 10 is supported. The electric motor 30 preferably is mounted above the front wheel 11 and operably coupled to the front wheel 11 such that electric powered rotational forces are transferred from the electric motor 30 to the front wheel 11. In another embodiment, the electric motor is supported adjacent the wheel hub by either the fork 13 or the wheels axle or hub. Alternatively, the electric motor 30 can be integrated with the wheel 11 and can be configured to drive the wheel 13 directly. In other embodiments, the electric motor 30 can include an endless drive system operatively coupled to the front wheel 11, and the endless drive system can include a chain or belt that transfers rotational power to the front wheel 11. In yet other embodiments, the vehicle includes a transmission operatively configured between the electric motor and the wheel 11, and the transmission transfers power from the motor to drive the axle or hub of the wheel 11. The transmission can be a geared transmission and can include a clutch or freewheel that allows the wheel 11 to rotate when not being driven by the motor.

Figure 3:
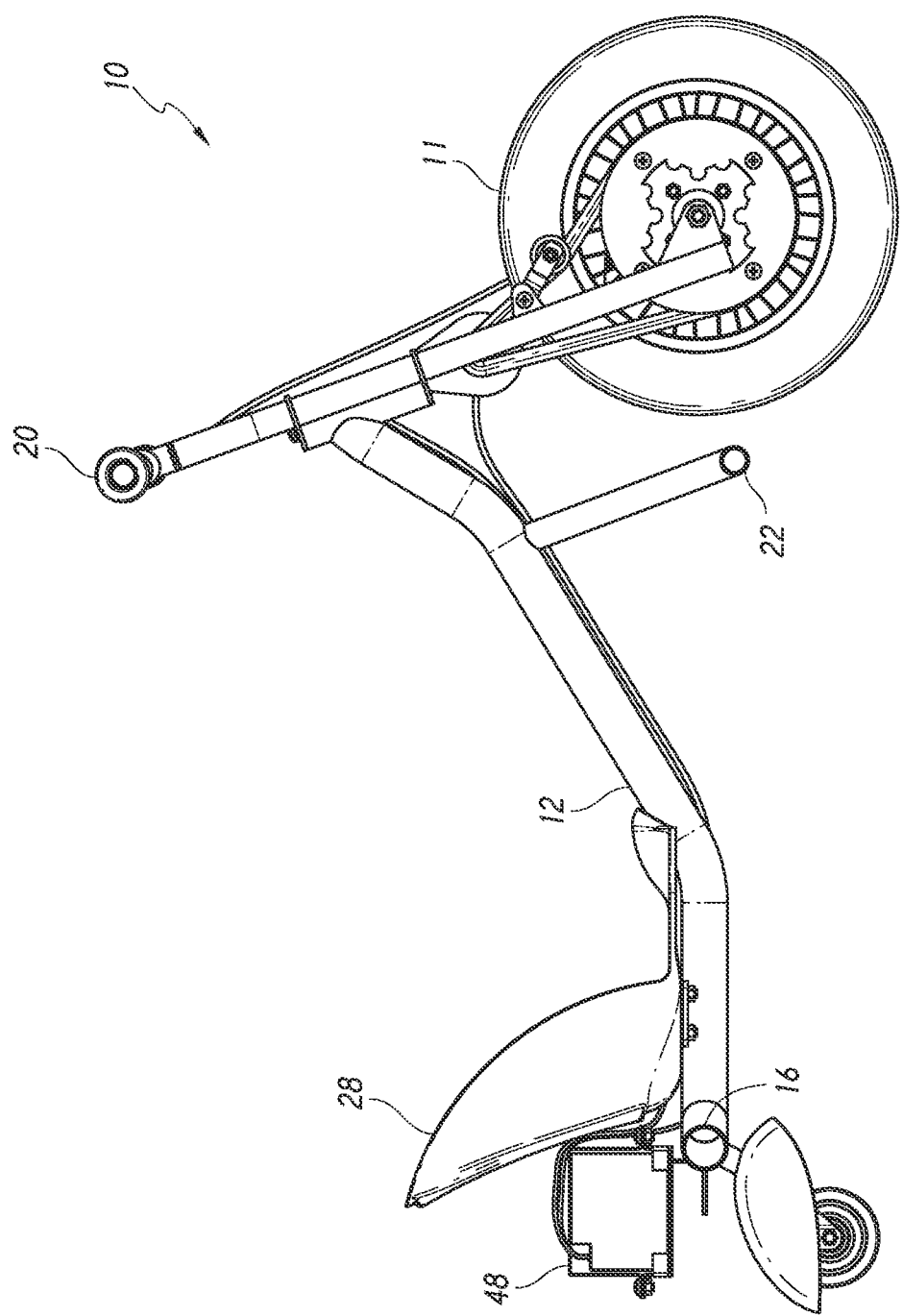
FIG. 3 is a right side view of the electric powered tricycle of FIG. 1.
Figure 4:
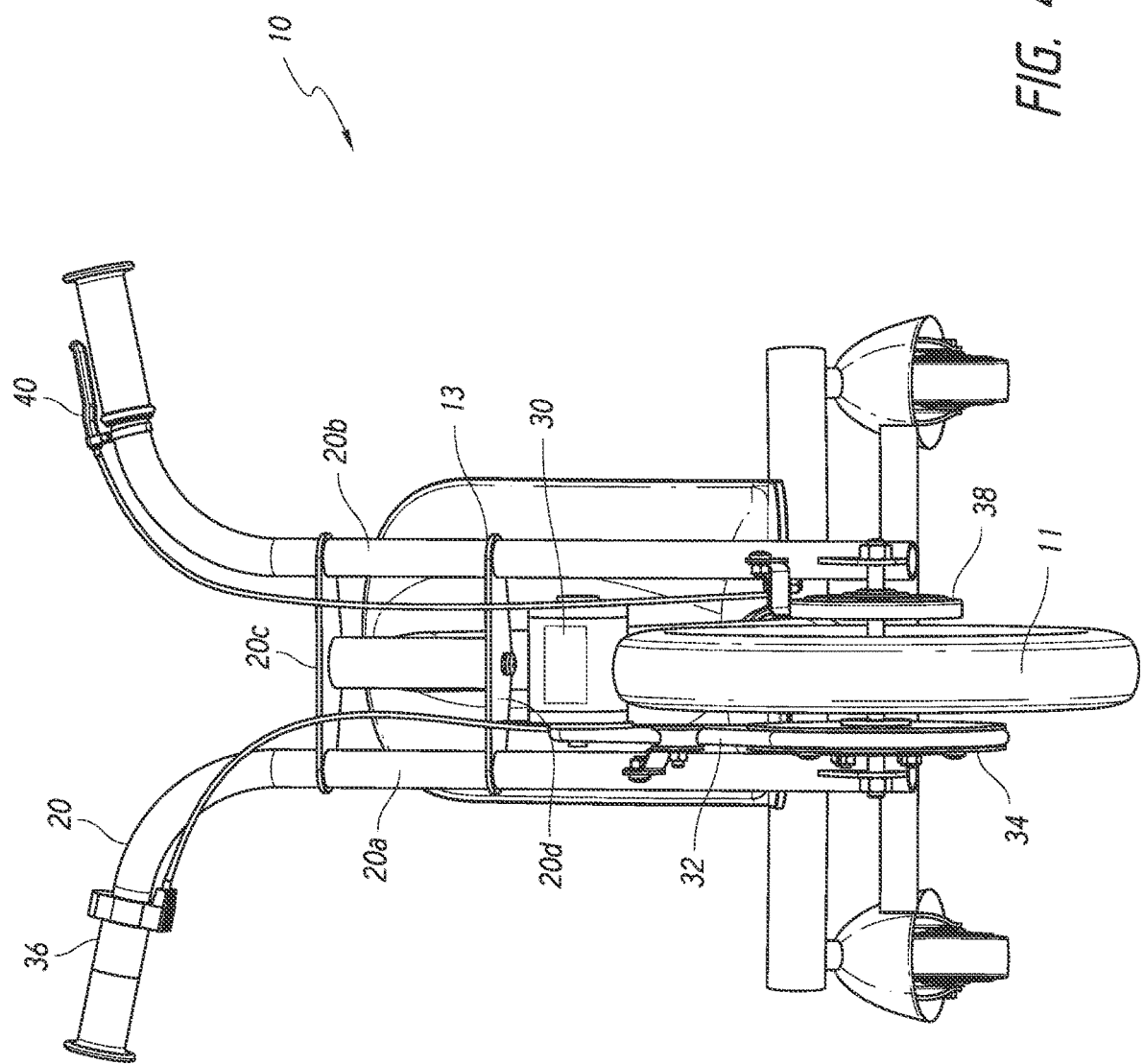
FIG. 4 is a front view of the electric powered tricycle of FIG. 1.

A brake mechanism includes a brake lever 40 and a brake 38 (FIG. 4). The brake lever 40 is operably mounted on the handlebar assembly 20 and, preferably, accessible to the user while maintaining directional control of the tricycle. In operation, actuation of the brake lever 40 causes a brake lever cable to be put in tension and moved upwards toward the handlebar assembly 20, actuating a pair of opposing calipers and causing said calipers to apply frictional braking forces on the lateral sides of the braking disc 38. In another preferred embodiment, a traditional bicycle caliper or cantilever brake system may be used to apply a frictional braking force on the rim of the front wheel 11. In other embodiments, a drum style brake could be used. Several variations of the front braking mechanism may be possible and it will be understood by those with ordinary skill in the art that this application is intended to cover any such variations, uses, or adaptations of the disclosed device. In a preferred embodiment, actuation of the brake lever 40 causes a frictional braking force to be applied to the braking disc 38 in conjunction with isolating the electric motor 30 from its power source (e.g., battery 48—FIG. 3) such that power transfer from the electric motor 30 to the front wheel 11 is lessened or terminated upon actuation of the brake lever 40. Although the illustrated power source is a battery 48, other suitable source of power can be used. Accordingly, unless indicated otherwise, the use of the term "battery" in the present disclosure can refer to suitable power sources in general. The brake mechanism is operatively coupled to the battery 48 and/or motor 30 in order to lessen or stop power transfer to the front wheel 11. The actuation of the brake lever 40 can stop the power transfer from the power source 48 to the motor 30 and/or it can stop the power transfer from the motor 30 to the front wheel 11. One such arrangement incorporates a cut-off switch that is actuated along with actuation of the brake lever 40 or other portion of the brake system. Another arrangement could be a clutch between the motor 30 and the front wheel 11 that actuates when the brake lever 40 or other part of the brake mechanism is actuated. In other embodiments, the brake lever 40 can alternatively be a lever or button that is accessible to the foot of user, for example, a lever supported by the foot rest 22.

Figure 2:
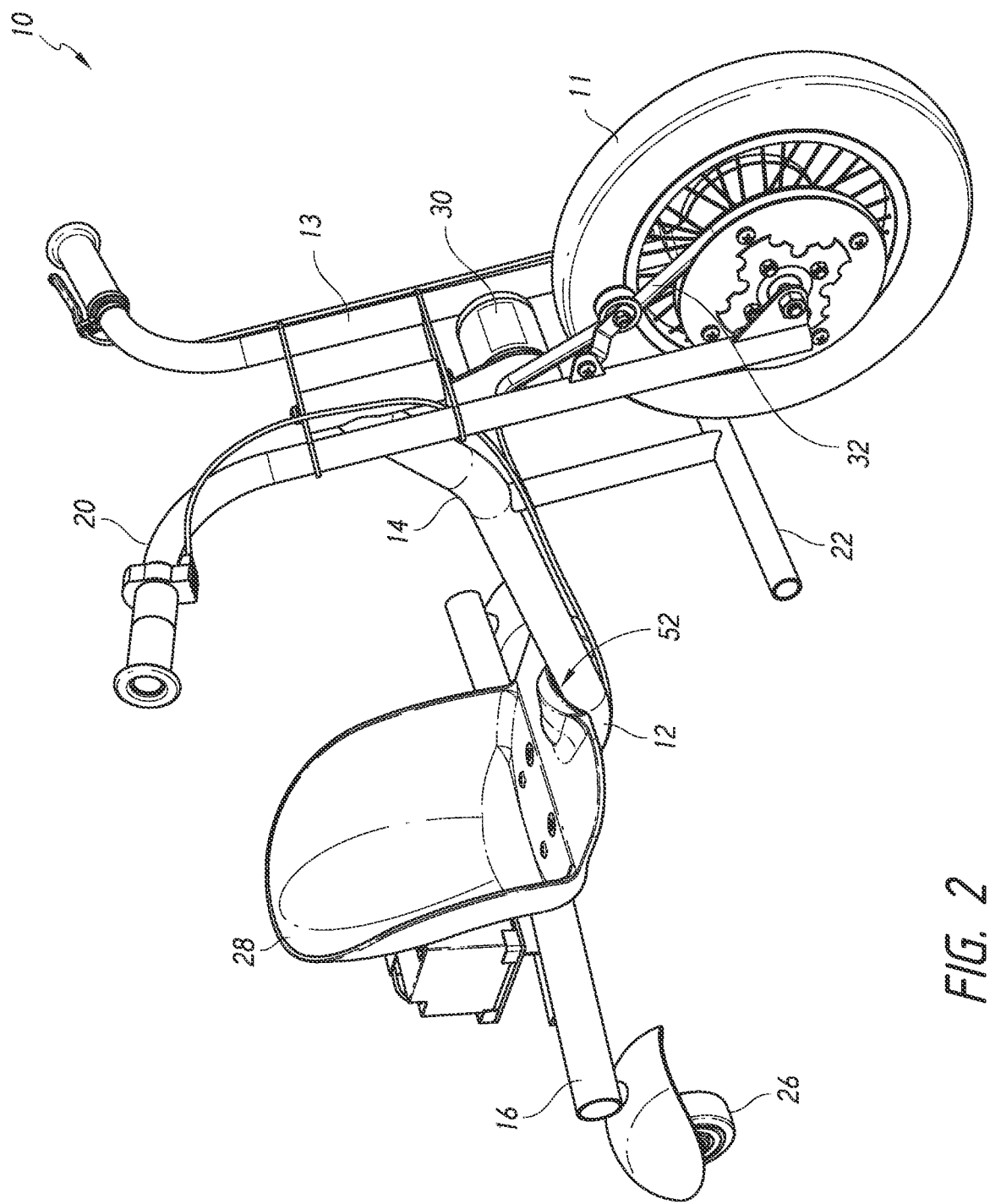
FIG. 2 is a perspective front and right side view of the electric powered tricycle of FIG. 1.

With reference to FIG. 2 and FIG. 4, a driven wheel, gear or sprocket 34 is shown mounted to the axle or hub of the front wheel 11 such that a rotational force exerted on the driven sprocket 34 forces a turning of the front wheel 11. The driven sprocket 34 is operably coupled to a drive shaft (preferably supporting a drive wheel, gear or sprocket) of the electric motor 30 by an endless drive loop, such as a drive belt or the illustrated drive chain 32. In a preferred embodiment, the drive chain 32 is operably coupled to sprocket 34 connected to the axle of the front wheel 11, said sprocket 34 comprising a one-way clutch mechanism, which is configured to allow the front wheel 11 to rotate at a greater speed relative to the sprocket 34 (i.e., an over-speed clutch). In another embodiment, the motor 30 in configured to drive the wheel 11 by applying a rotational force directly to the outer circumferential portion of the wheel 11 using a roller or other drive mechanism. Another embodiment includes a transmission between the motor 30 and the front wheel 11 that is configured to drive the axle of the front wheel using the power generated by the motor 30. For example, a geared transmission with a clutch could be used to the drive the front wheel 11. In an alternative embodiment, the motor 30 could be located adjacent the axle of the wheel 11 and could be integrated with the wheel such that the motor 30 directly transfers rotational force to the wheel and drives the wheel.

Opposite the drive sprocket 34 on the front wheel 11, a braking disc 38 is mounted on the axle of the front wheel 11 such that applying braking forces to the braking disc 38 causes the front wheel 11 to slow in rotation. Some conventional tricycles comprise foot pedals coupled to the front wheel to allow the user to propel the tricycle forward. However, embodiments of the present tricycle include an alternative placement of the user's feet while seated and operating the tricycle. A preferred embodiment further comprises a foot rest portion 22 configured to allow the user to rest his/her feet away from the moving components, including the front wheel 11, driven sprocket 34, drive chain 32, and braking disc 38. The foot rest portion 22 may be fixedly coupled to the frame 12 or to the front fork 13. A configuration with the foot rest portion 22 attached to the frame 12 allows the user to place the user's feet on the foot rest portion 22 and rotate the front fork 13 to turn the front wheel 11 without the positioning of the user's feet being rotated along with the front fork. In some conventional tricycles, the user would rest the user's feet on the foot pedals coupled to the front wheel, possibly resulting in uncomfortable twisting of the user's body and legs when turning the front fork and front wheel. However, in some embodiments of the tricycle, foot rest portions could also be supported by the front wheel 11 or the fork 13.

FIG. 3 depicts a side view of a preferred embodiment of the tricycle 10. The frame 12 of the tricycle 10 may also support a seat 28 for the user connected to the frame 12. The seat 28 may be configured to allow the user to sit comfortably in a position such that the handlebar assembly 20 and foot rest 22 are within comfortable range of the user's hands and feet. In one arrangement, portions of the foot rest 22 upon which a user's feet rest are located behind a rearwardmost point on the front wheel 11. The foot rest 22 can be in the form of an upside-down T-bar that extends from the front portion 14 of the frame 12. The front portion 14 of the frame 12 can extend upwardly from the forward end of the seat 28 to the front fork 20. In some arrangements, the seat 28 may be adjustable in fore-aft and/or height directions. In some embodiments, the seat 28 can comprise a raised portion 50 (FIG. 1) and a recess 52 (FIG. 2). In a preferred embodiment, the battery 48 and battery housing may be mounted behind the seat 28. The battery 48 may be supported by the rear portion of the frame 16 such that it is inaccessible to the user while the user is seated. This generally allows for a visually pleasing configuration of the tricycle 10 as the battery, battery housing, and any wires connected to the battery may be concealed from the user by the seat. In addition, mounting the battery 48 and battery housing behind the seat may also add additional weight to the rear of the tricycle. This may be advantageous in operation of the tricycle when the rear of the tricycle is moving sideways in a substantially different direction than the front wheel 11 of the tricycle. The battery mounted at the rear of the tricycle, in addition to the user seated in the seat mounted toward the rear of the tricycle 10 may create an unbalanced weight distribution favored toward the rear of the tricycle 10 thereby increasing the centrifugal force when the rear of the tricycle is directed in a substantially different direction than the front wheel of the tricycle. The battery housing (or a separate cowling or enclosure) can completely or substantially completely enclose the battery. The housing can be separate from the seat 28 or could partially (e.g., the backrest) or fully incorporate the seat 28.

FIG. 4 depicts a front view of a preferred embodiment of the tricycle 10 showing the front fork 13, a front wheel 11 mounted on said front fork 13, a handlebar assembly 20, and an electric motor 30 supported by the front fork 13. In a preferred embodiment, a controller or throttle assembly 36 is operably mounted on the handlebar assembly 20 and positioned to allow the user to actuate the throttle while maintaining directional control of the tricycle. The throttle assembly 36 is operably connected to the motor 30 and battery 48 to generate the rotational force upon the driven sprocket 34 upon the user activating the throttle. The controller or throttle assembly 36 may be configured to be a twistable throttle, or the throttle assembly may comprise a lever or button, or other suitable user control arrangements. In other embodiments, the controller or throttle assembly 36 is accessible to the foot of the user and can be arranged as a throttle pedal or lever accessible to the user. For example, the throttle actuator can be supported adjacent to the foot rest 22 and can be actuated by the foot of a user.

A preferred embodiment of the tricycle 10 further comprises a brake lever 40 mounted to at least one handlebar handgrip to allow the user to actuate the braking assembly to apply frictional braking forces upon the braking disc 38. In a preferred embodiment, the braking disc 38 or other braking mechanism is concentrically mounted to the axle of the front wheel 11. In yet another preferred embodiment, a driven sprocket 34 is mounted concentrically on the axle of the front wheel 11 and opposite the braking disc 38, said driven sprocket 34 operably coupled to the electric motor 30 by a drive chain 32. In another preferred embodiment, the electric motor 30 is operably coupled to a powered roller, which transfers rotational force to the front wheel by applying frictional rotational force upon the outer circumference of the front wheel 11. Alternatively in this embodiment, the powered roller may transfer rotational force to the front wheel by applying frictional rotational force upon the outer circumference of a driven hub, which is concentrically mounted to the front axle of the front wheel. In a preferred embodiment, the front wheel 11 comprises a treaded tire composed of a durable material such as rubber for contacting the ground and converting the rotational force from the electric motor 30 into locomotion of the tricycle 10. Other suitable drive arrangements can also be used. For example, the motor could be integrated into the hub of the front wheel and provide direct drive of the front wheel.

A preferred embodiment includes a steering mechanism that comprises a front fork 13 configured to support the front wheel 11 and handlebar assembly 20. In a preferred embodiment, the electric motor 30 is supported by the front fork 13 enabling said electric motor 30 to be operably coupled to a driven sprocket 34 mounted on the axle of the front wheel 11. When the user turns the handlebar assembly 20 to steer the front wheel 11, the front fork 13 is rotated about its steering axis, resulting in rotation of the front fork 13, electric motor 30, driven sprocket 34, and front wheel 11 in unison. This configuration avoids tangling cables or drive chains between the front wheel 11 and handlebar assembly 20 and electric motor 30 and provides a reliable design that is cost-effect to manufacture. In a preferred embodiment, the front fork 13 is defined by two vertical supports 20a, 20b, said vertical supports 20a, 20b interconnected by at least one support member, and preferably a pair of support members 20c, 20d positioned above and below a head tube portion of the frame 12. Such a configuration of said vertical supports 20a, 20b provides a void therebetween, where said void is configured to support the electric motor therein. This configuration allows for the electric motor 30 to be mounted in between the vertical supports 20a, 20b of the front fork 20, providing protection for the electric motor 30 and associated components such as the drive chain 32 and driven sprocket 34 from damage due to collision with objects or other vehicles. The motor 30 may also be located between the at least one support member 20c or 20d that interconnects the vertical supports 20a, 20b and the front wheel 11. Alternatively, the motor 30 can be between the lowermost support member 20d and the front wheel 11. Such an arrangement can allow the motor to occupy a space between the front wheel 11 and the frame 12 of the tricycle to provide further protection to the motor. In addition, a portion of the front fork 20 (e.g., the lowermost support member 20d) can also serve as a mount for the motor, which reduces the number of components of the tricycle. Preferably, the vertical supports 20a, 20b bend outwardly at their upper ends to define handgrip portions of the handlebar assembly 20, thereby providing an efficient arrangement from a manufacturing perspective. A housing, shroud or other enclosure can be provided to partially or completely enclose the motor 30, drive chain 32 and driven sprocket 34.

Figure 5:
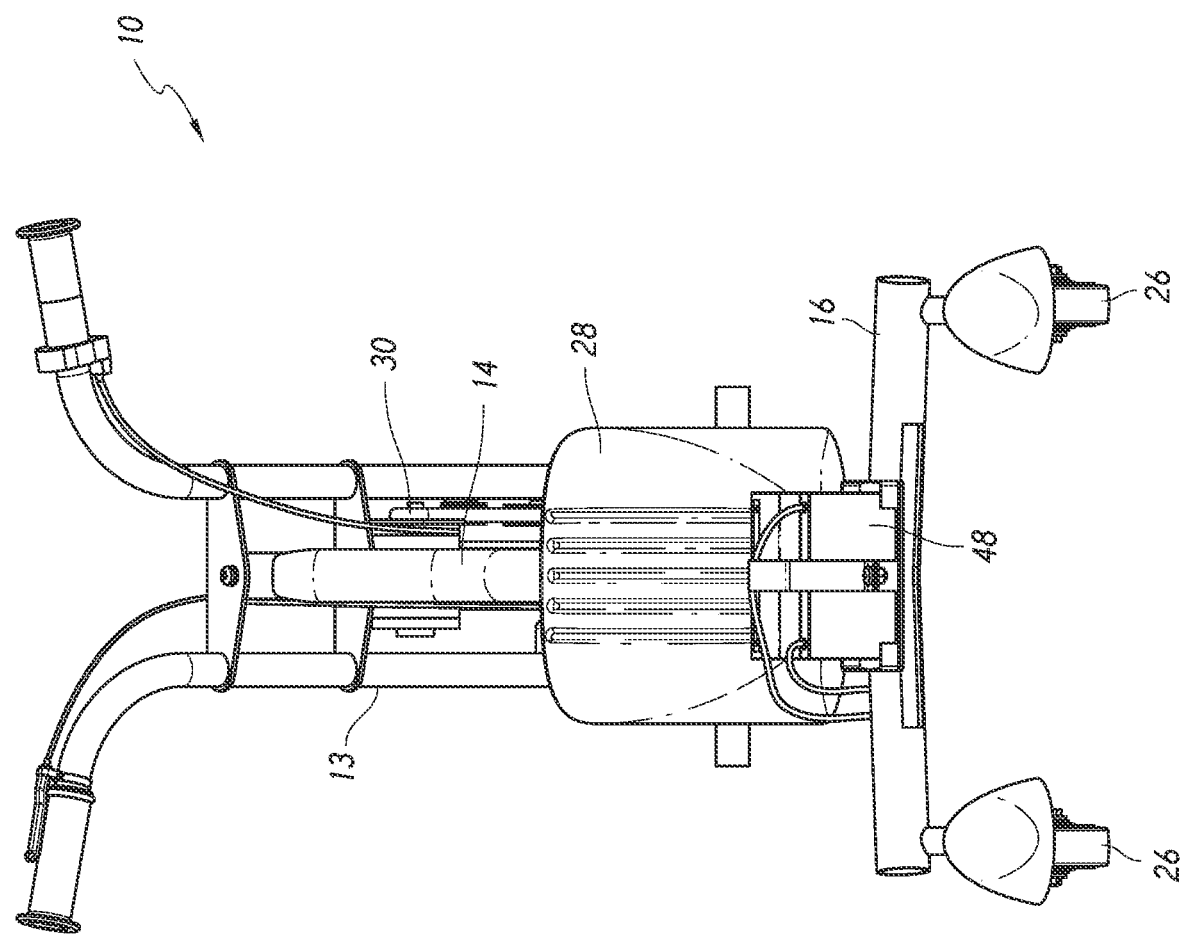
FIG. 5 is a rear view of the electric powered tricycle of FIG. 1.

FIG. 5 shows a preferred embodiment from a rear perspective. The preferred embodiment as depicted shows a battery 48 mounted to the rear portion of the frame 16. Power is provided to the electric motor 30 by a source of power, such as a battery 48 and, preferably, a battery housing that contains at least one battery and a controller. The at least one battery 48 is typically rechargeable and employs a recharging system that is configured to draw power from a conventional single phase power outlet or other commonly available source of power. In a preferred embodiment, the battery housing provides a switch for powering the electric motor 30 on or off, as well as a charger port connection for recharging the at least one battery 48. In another preferred embodiment, the seat 28 may be configured to comprise a battery housing on the rear of the seat back such that the battery 48 is mounted to the seat 28. For stability, the seat 28 is typically fixed to the frame as low to the ground as possible. In a preferred embodiment, the power stored by the at least one battery 48 is channeled to the electric motor 30, which may be mounted on the front fork 13 of the front wheel 11. In one embodiment, a controller or control mechanism is coupled to the battery 48 and/or motor 30 and is configured to control the transfer of power from the battery 48 to the motor 30. Also, the controller mechanism can control the transfer of power from the motor 30 to the front wheel. For example, the controller is accessible to the user and upon actuation it actuates and switch or a variable switch that allows power transfer from the battery 48 to the motor 30. The brake mechanism can also be coupled to the motor 30 and/or battery 48 such that it can stop power transfer when the brake is actuated. For example, when a user actuates the brake or brake lever 40, a switch or cut-off switch can cause the power transfer from the battery to the motor 30 to lessen or stop.

In another preferred embodiment, the rear portion of the frame and the front portion of the frame comprise hollow tube chassis, and the wires electrically coupling the at least one battery 48 to the electric motor 30 may be positioned partially, substantially completely or completely within said hollow tube chassis. For example, the wires may run internal to the frame from at or near the location of the battery 48 to the forward end of the frame and may exit from the forward end of the frame.

A preferred embodiment further comprises two rear swivel caster wheels 26 supported by the frame 12 which may be dynamically engaged to induce and control drift during a turn. A caster wheel can include a wheel configured to rotate around a rotational axis and a fork supporting the wheel, which enables the swivel caster wheel to swivel around a swivel axis. However, other types of caster wheels are supported with a support only on one side supporting the axle. It is contemplated that various types of other axially rotating wheels and caster wheels could be used in these embodiments. In a preferred embodiment, the rear swivel caster wheels are allowed to rotate without rotational limitation or biasing force, and in yet another preferred embodiment, the rear swivel caster wheels are prevented from full 360 degree rotation by a limiting stop. In another preferred embodiment, the rear swivel caster wheel assemblies comprise a biasing member causing the rear swivel caster wheels to be biased to a neutral steering position and causing the swivel caster wheel assembly to return to its neutral steering position the external swiveling forces have been removed or reduced below a threshold force. An additional embodiment combines the biasing arrangement and the rotational limits.

Figure 6:
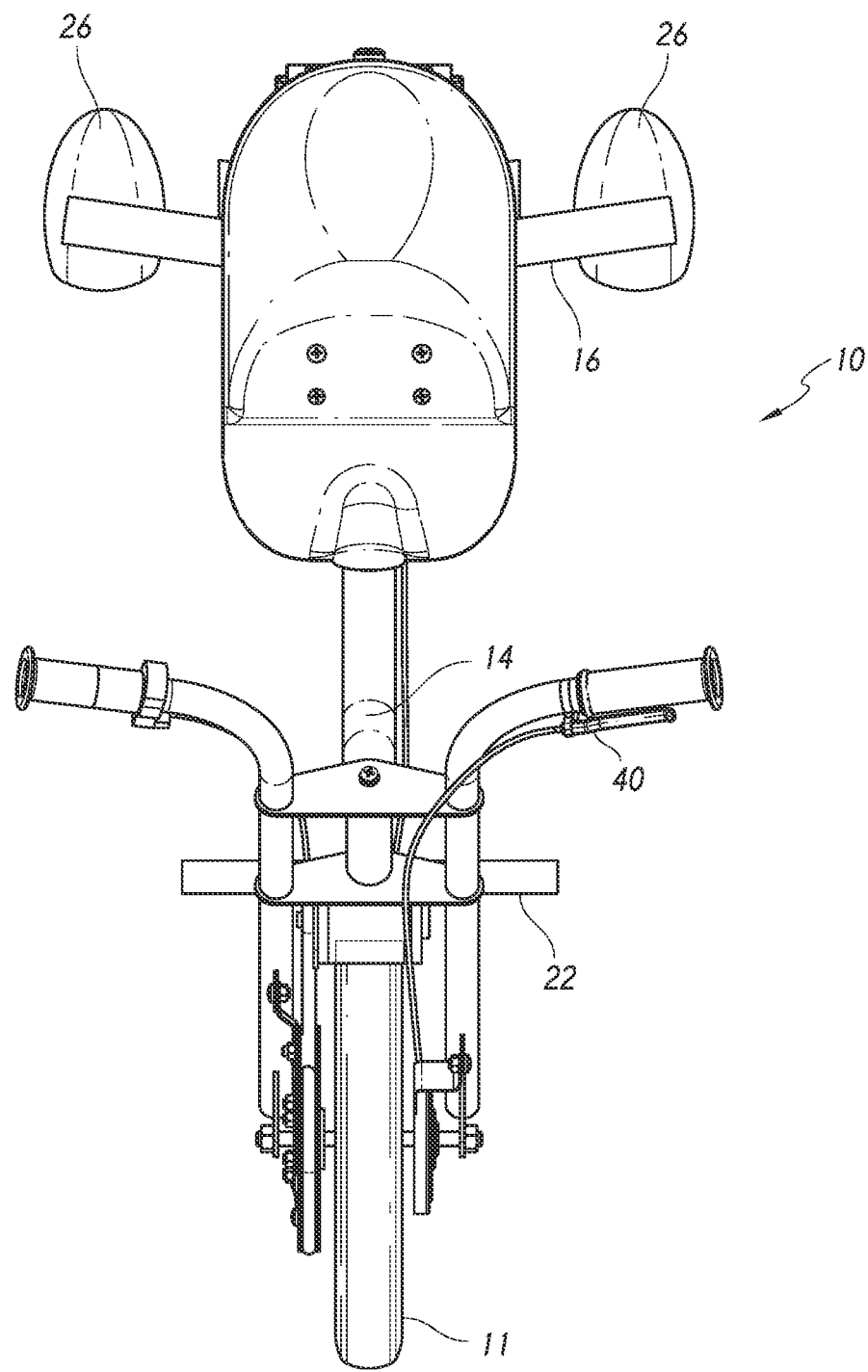
FIG. 6 is a top view of the electric powered tricycle of FIG. 1.

FIG. 6 shows a preferred embodiment from a top-down perspective. This embodiment comprises a rear portion of the frame 16 connected to a front portion 14 of the frame 12, said rear portion 16 of the frame 12 supporting the two rear swivel caster wheels 26. The rear portion 16 of the frame 12 may be configured to extend substantially outwardly from the front portion 14 of the frame 12, said rear portion 16 having a first and second distal end, said first distal end supporting the one rear swivel caster wheel 26, and said second distal end supporting one rear swivel caster wheel 26. This configuration provides stability for the user while operating the tricycle, allowing the user to spin the tricycle and exert sideways forces upon the rear end such that the rear end of the tricycle travels in a substantially different direction than the general direction of the front wheel 11. This allows for increased enjoyment and a wide variety of trick maneuvers to be performed by the user. In other embodiments, the vehicle includes more than two rear caster wheels that are supported by the rear portion 14 of the frame 12.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In particular, while the present systems and methods have been described in the context of particularly preferred embodiments, the skilled artisan will appreciate, in view of the present disclosure, that certain advantages, features and aspects of the systems and methods may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. In particular, an embodiment includes the combination of features described above with respect to the individual photographs in a single tricycle.

What is claimed is:

1. A tricycle comprising:
    a frame comprising a front portion and a rear portion, the rear portion comprising a first leg and a second leg, each of the first and second legs extending outward from a longitudinal axis of the tricycle;
    a seat connected with the frame, wherein the seat is adjacent to or above an intersection of the first and second legs;
    a front wheel rotatable about a steering axis with respect to the frame;
    a first rear wheel connected with the first leg and a second rear wheel connected with the second leg, each of the first and second rear wheels configured to rotate;
    a foot support directly connected to the frame, the foot support comprising a pair of substantially coaxial foot rests extending laterally outward on opposite sides of the tricycle from respective cantilevered connection points;
    a front fork connected with the frame and the front wheel;
    a power source; and
    a motor operably connected with the power source.

2. The tricycle of claim 1, wherein the seat comprises a raised portion and a recess, the raised portion being disposed at a midpoint of a lateral width of the seat, wherein a portion of the frame is received in the recess.

3. The tricycle of claim 1, wherein a diameter of the front wheel is larger than a diameter of each of the first and second rear wheels.

4. The tricycle of claim 1, wherein the steering axis is an inclined steering axis.

5. The tricycle of claim 1, further comprising a handlebar connected with the front fork, wherein at least a portion of each of the first and second rear wheels is positioned laterally inside a footprint of the handlebar when the tricycle is traveling in a straight line.

6. The tricycle of claim 1, wherein the front fork comprises a first inclined support on a first lateral side of the front wheel and a second inclined support on a second lateral side of the front wheel.

7. The tricycle of claim 6, wherein the motor is positioned between the first and second inclined supports.

8. The tricycle of claim 1, wherein the motor is configured to provide rotational force to the front wheel.

9. A personal mobility vehicle comprising:
    a frame comprising a front portion and a rear portion, the rear portion comprising a first leg and a second leg, each of the first and second legs extending outward from a longitudinal axis of the personal mobility vehicle, the first and second legs fixed relative to each other;
    a seat connected with the frame, wherein the seat comprises a raised portion;
    a front wheel rotatable about a steering axis;
    a first rear wheel connected with the first leg and a second rear wheel connected with the second leg, each of the first and second rear wheels configured to rotate;
    a front fork connected with the frame and the front wheel;

a pair of substantially coaxial foot rests extending laterally outward on opposite sides of the personal mobility vehicle from respective cantilevered connection points;
a power source; and
a motor operably connected with the power source.

10. The vehicle of claim 9, wherein the raised portion of the seat is disposed at a midpoint of a lateral width of the seat.

11. The vehicle of claim 9, wherein the raised portion of the seat is disposed along the longitudinal axis of the vehicle.

12. The vehicle of claim 9, wherein the raised portion of the seat is disposed at a front end of the seat.

13. The vehicle of claim 9, wherein a diameter of the front wheel is larger than a diameter of each of the first and second rear wheels.

14. The vehicle of claim 9, wherein the steering axis is an inclined steering axis.

15. The vehicle of claim 14, wherein the front fork is rotatable about the inclined steering axis to rotate the front wheel, and wherein at least a portion of the foot support is located rearward of at least a portion of the rotatable front fork.

16. The vehicle of claim 9, further comprising a handlebar connected with the front fork, wherein at least a portion of each of the first and second rear wheels is positioned laterally inside a footprint of the handlebar when the vehicle is traveling in a straight line.

17. A tricycle comprising:
a frame comprising a front portion and a rear portion, the rear portion comprising a first leg and a second leg, each of the first and second legs extending outward from a longitudinal axis of the tricycle;
a front wheel rotatable about a steering axis;
a first rear wheel connected with the first leg and a second rear wheel connected with the second leg, each of the first and second rear wheels configured to rotate;
a seat connected with the frame, wherein a portion of the seat is disposed at the same height as or above a portion of the front wheel;
a front fork connected with the frame and the front wheel;
a foot support connected to the frame, the foot support comprising a pair of substantially coaxial foot rests extending laterally outward on opposite sides of the tricycle from respective cantilevered connection points;
a power source; and
a motor operably connected with the power source.

18. The tricycle of claim 17, wherein the seat comprises a raised portion and a recess, the raised portion being disposed at a midpoint of a lateral width of the seat, wherein a portion of the frame is received in the recess.

19. The tricycle of claim 17, wherein a diameter of the front wheel is larger than a diameter of each of the first and second rear wheels.

20. The tricycle of claim 17, wherein the steering axis is an inclined steering axis.

21. The tricycle of claim 17, wherein the front fork comprises a first inclined support on a first lateral side of the front wheel and a second inclined support on a second lateral side of the front wheel.

22. A personal mobility vehicle comprising:
a frame comprising a front portion and a rear portion, the rear portion comprising a first leg and a second leg, each of the first and second legs extending outward from a longitudinal axis of the personal mobility vehicle;
a seat connected with the frame, wherein the seat is adjacent to an intersection of the first and second legs;
a front wheel rotatable about an inclined steering axis;
a first rear wheel connected with the first leg and a second rear wheel connected with the second leg;
a foot rest, wherein the entirety of the foot rest is positioned behind a rearward-most point of the front wheel;
a front fork connected with the frame, the front fork comprising a first inclined support on a first lateral side of the front wheel and a second inclined support on a second lateral side of the front wheel;
a power source positioned behind the seat; and
a motor operably connected with the power source, wherein the motor is positioned between the first and second inclined supports.

23. The vehicle of claim 22, wherein the seat comprises a raised portion disposed at a front end of the seat at a midpoint of a lateral width of the seat.

24. The vehicle of claim 22, wherein a portion of the seat is disposed at the same height as a portion of the front wheel.

25. A personal mobility vehicle comprising:
a frame comprising a front portion and a rear portion, the rear portion comprising a first leg and a second leg, each of the first and second legs extending outward from a longitudinal axis of the personal mobility vehicle;
a seat connected with the frame, wherein the seat comprises a raised portion;
a front wheel rotatable about a steering axis;
a first rear wheel connected with the first leg and a second rear wheel connected with the second leg, each of the first and second rear wheels configured to rotate;
a front fork connected with the frame and the front wheel;
a handlebar connected with the front fork, wherein at least a portion of each of the first and second rear wheels is positioned laterally inside a footprint of the handlebar when the vehicle is traveling in a straight line;
a pair of substantially coaxial foot rests extending laterally outward on opposite sides of the personal mobility vehicle from respective cantilevered connection points;
a power source; and
a motor operably connected with the power source.

* * * * *